FIG. 1

INVENTORS
ROBERT W. BENSON
JOHN F. WIRLEY

ATTORNEY

Nov. 6, 1962  R. W. BENSON ETAL  3,062,534
SHEET FEED MECHANISM

Filed July 3, 1961  12 Sheets-Sheet 2

FIG. 2

INVENTORS
ROBERT W. BENSON
JOHN F. WIRLEY
BY
*Norman P. Schroeder*
ATTORNEY

FIG. 3

INVENTORS
ROBERT W. BENSON
JOHN F. WIRLEY

Nov. 6, 1962 R. W. BENSON ETAL 3,062,534
SHEET FEED MECHANISM
Filed July 3, 1961 12 Sheets-Sheet 5

INVENTORS
ROBERT W. BENSON
JOHN F. WIRLEY
BY
ATTORNEY

Nov. 6, 1962 R. W. BENSON ETAL 3,062,534
SHEET FEED MECHANISM
Filed July 3, 1961 12 Sheets-Sheet 7

INVENTORS
ROBERT W. BENSON
JOHN F. WIRLEY
BY
ATTORNEY

INVENTORS
ROBERT W. BENSON
JOHN F. WIRLEY
BY
ATTORNEY

FIG. 14

Nov. 6, 1962    R. W. BENSON ETAL    3,062,534
SHEET FEED MECHANISM

Filed July 3, 1961    12 Sheets-Sheet 11

INVENTORS
ROBERT W. BENSON
JOHN F. WIRLEY
BY
ATTORNEY

3,062,534
SHEET FEED MECHANISM
Robert W. Benson, Rochester, and John F. Wirley, Webster, N.Y., assignors to Xerox Corporation, Rochester, N.Y., a corporation of New York
Filed July 3, 1961, Ser. No. 121,784
3 Claims. (Cl. 271—36)

This invention relates in general to xerographic apparatus and, in particular, to a sheet transfer material feeding mechanism by which sheets of transfer material are fed seriatim to a xerographic drum.

More specifically, the invention relates to an improved sheet transfer material feeding mechanism that is particularly adapted for use in xerographic reproducing machines, and is also suitable for use with comparable types of devices.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity that reaches them and thereby creates an electrostatic latent image on or in the plate coating.

Development of the image is effected with developer material or developers which comprise, in general, a mixture of a suitable pigmented or dyed electroscopic powder, hereinafter referred to as toner, and a granular carrier material, which later functions to carry and to generate triboelectric charges on the toner. More exactly, the function of the granular material is to provide the mechanical control of the powder, or to carry the powder to an image surface and, simultaneously, to provide almost complete homogeneity of charge polarity. In the development of the image, the toner powder is brought into surface contact with the coating and is held thereon electrostatically in a pattern corresponding to the electrostatic latent image. Thereafter, the developed xerographic image is usually transferred to a support or transfer material to which it may be fixed by any suitable means.

Since the disclosure of the basic concept of xerography by Carlson, a variety of machines and devices have been proposed to incorporate such teachings in a manner to form copy xerographically on a commercial basis. For the most part, each of such devices has been specifically designed to the solution of a particular reproduction problem and, for the most part, has been limited to the particular use intended. Although certain of these machines are presently in wide commercial use, none can be considered to be of general application of the type required in most business offices. For example, prior art machines are usually limited as to the type of original that may be used therewith, or as to the type and size of transfer material that can be employed therein, or as to the flexibility of operation of the machine itself.

It is therefore the principal object of this invention to improve the sheet feeding mechanism for use in automatic xerographic apparatus in which a reusable xerographic plate may successively be charged, exposed and developed, and in which the developed image may readily be transferred to a sheet of transfer material, such as paper or similar material, and thereby permit continuous reuse of the xerographic plate.

Another object of this invention is to improve sheet feeding mechanisms for feeding sheets seriatim to a rotating drum independently of the drum's rotative cycle.

A further object of this invention is to improve sheet feeder mechanisms for use in a xerographic apparatus having a movable xerographic plate capable of having a xerographic image formed anywhere on its photoconductive surface.

For a better understanding of the invention as well as other objects and further features thereof, reference is had to the following detailed description of the invention to be read in connection with the accompanying drawings, wherein:

FIG. 16 is a front view of a preferred embodiment of the clutch mechanism of the invention for controlling the operation of the paper feed system;

FIG. 18 is a side view of the electromagnetic clutch mechanism and its contacts, with parts broken away to show details of the contacts; and, FIG. 19 is a simple schematic electrical wiring diagram of the clutch circuit.

Figure 1:
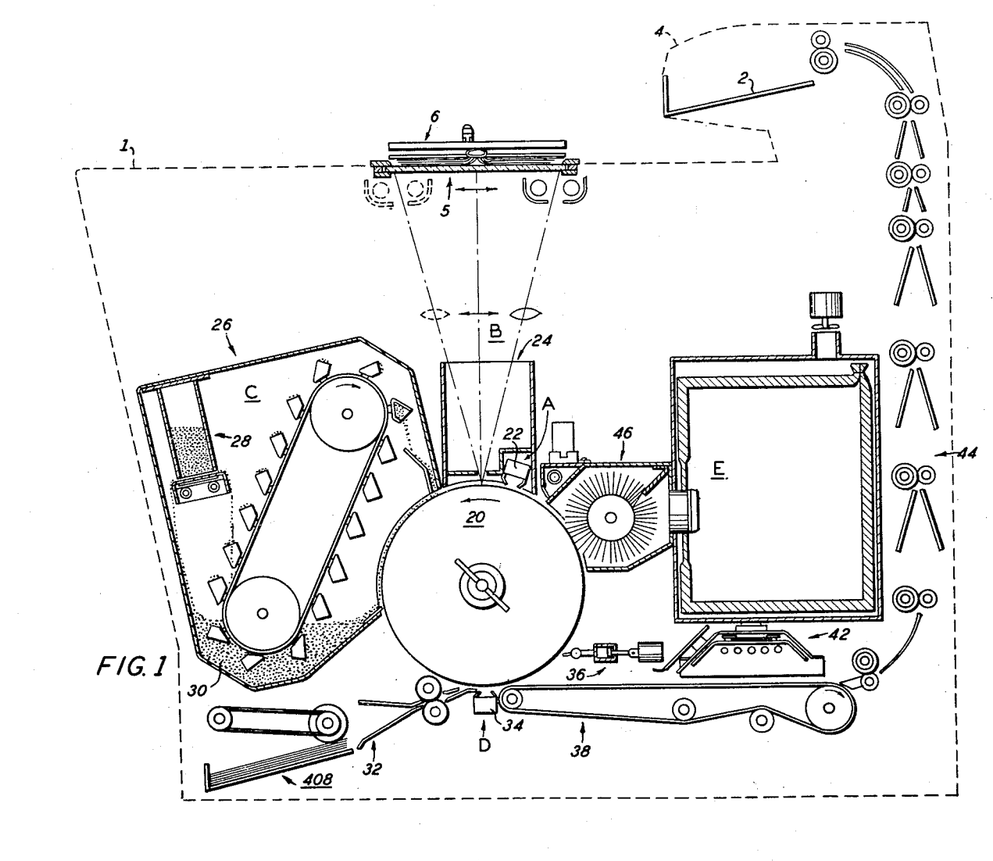
FIG. 1 illustrates schematically a preferred embodiment of a xerographic apparatus adapted for continuous and automatic operation and incorporating an optical scanning mechanism.
Figure 2:
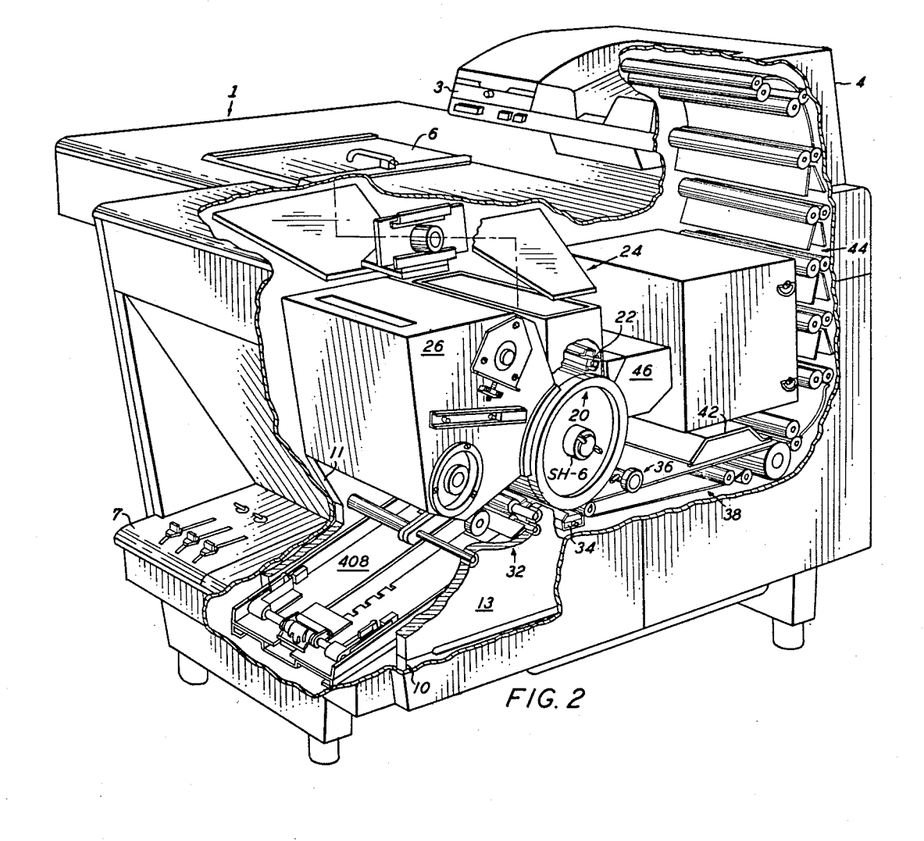
FIG. 2 is a right-hand perspective view of the xerographic apparatus with parts of the desk covering broken away to show the arrangement of the xerographic machine elements.
Figure 3:
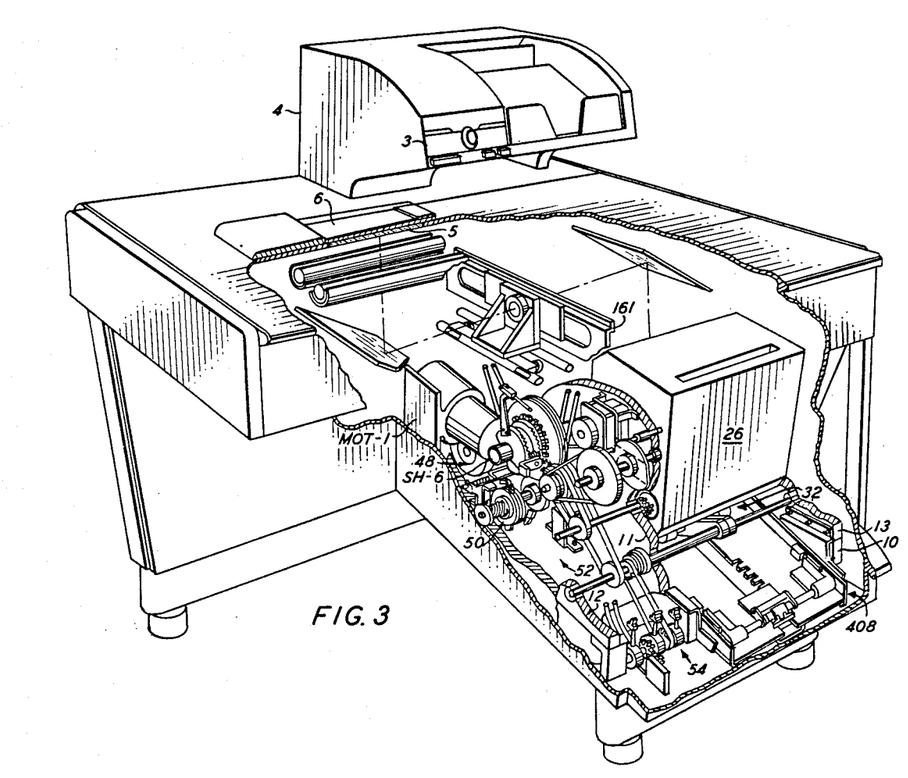
FIG. 3 is a left-hand perspective view of the xerographic apparatus with the parts of the desk covering broken away to show the arrangement of the xerographic machine elements.

Referring now to the drawings, there is shown in FIGS. 1, 2 and 3, a xerographic apparatus used for producing xerographic reproductions from a stationary original, the original being either transparent, translucent or opaque copy, whether in the form of single sheets, books, or in three-dimensional form. To conform to modern office decor the xerographic apparatus is adapted for installation in a suitable desk, constructed so that an operator seated at the desk may conveniently control all operations of the apparatus.

The desk, generally designated 1, constructed in a conventional manner, has mounted on the top and in the right-hand corner thereof, a main control panel for initiating the operation of the machine and for selecting and indicating the number of reproductions to be made, and a collecting tray 2 for finished reproductions, usually made on paper. Although the reproductions may be discharged from the apparatus for collection at any point accessible externally of the machine, it is preferred that the discharge terminal of the reproduction or paper feed means be embodied in a super-structure 4 overhanging the rear portion of the desk top, said super-structure also housing the main control panel 3 of the apparatus. Thus the document holder or copyboard 5 and its covering platen 6 can be left unobstructed at the front part of the desk over the knee space.

In the lower right-hand corner of the desk is a second control panel 7 for additional control circuits and for levers to control the length of scan, to control the tensions of the paper separator rollers on a stack of paper to adjust for different paper weights, and for controlling the toner dispensing rate of the machine.

As shown schematically in FIG. 1, the xerographic apparatus comprises a xerographic plate including a photoconductive layer or light-receiving surface on a conductive backing and formed in the shape of a drum, generally designated by numeral 20, which is mounted on a shaft journaled in a frame to rotate in the direction indicated, by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the electrostatic charge on the drum surface in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and, A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus or corona charging device 22 includes a corona discharge array of one or more corona discharge electrodes that extend transversely across the drum surface and are energized from a high potential source and are substantially enclosed within a shielding member.

Next subsequent thereto in the path of motion of the xerographic drum is an exposure station B. This exposure station may be of one of a number of types of mechanisms or members such as desirably an optical scanning or projection system or the like, designed to project a line copy image onto the surface of the photoconductive xerographic drum from a stationary original. To permit substantially any type of original copy, including books, magazines and other types of cumbersome three-dimensional objects to be copied for the reproduction of specific information contained thereon, the optical projection system shown is of the type disclosed in copending Mayo application, Serial No. 783,388, filed December 29, 1958.

The optical scanning or projection assembly, generally designated 24, comprises a stationary copyboard 5, which may consist of a transparent plate member such as, for example, a glass plate or the like positioned parallel to the top of the desk, which is adapted to support a master or original, such as book 18 placed face downward on its upper surface, the copyboard being uniformly illuminated and arranged in light-projecting relation to the moving light-receiving surface of the xerographic drum 20. Uniform lighting is provided by a pair of lamps attached to a slotted light reflector mounted for movement to traverse the plane of the copyboard.

A light shield adapted to protect the xerographic drum from extraneous light is positioned adjacent to the surface of the xerographic drum. A slot aperture in the light shield extends transversely to the path of movement of the light-receiving surface of the xerographic drum 20 to permit reflected rays from the copyboard to be directed against a limited transverse area of the light-receiving surface as it passes therebeneath. As shown, the light shield also encloses the corona charging device 22.

To enable the optical system to be enclosed within a conventional-size desk, a folded optical system including an object mirror, a lens, and an image mirror is used in the preferred embodiment of the apparatus.

The lens element positioned between the copyboard and the light shield is arranged for movement in a path to traverse the plane of the copyboard in timed relation to the movement of the light source, whereby the subject image of the original supported by the copyboard is scanned in timed relation to the movement of the light-receiving surface of the xerographic drum to project a light image corresponding to the subject image onto the surface of the xerographic drum.

Adjacent to the exposure station is a developing station C, in which there is positioned a developer apparatus 26 including a casing or housing having a lower or sump portion for accumulating developing material 30. A bucket-type conveyor having a suitable driving means, is used to carry the developing material to the upper part of the developer housing where it is cascaded down over a hopper chute onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser, generally designated 28 of the type disclosed in copending Hunt application, Serial No. 776,976, filed November 28, 1958, is used to accurately meter toner to the developing material.

Positioned next and adjacent to the developing station is the image transfer station D which includes a sheet feeding mechanism adapted to feed sheets of paper successively to the xerographic drum in coordination with the presentation of the developed image on the drum at the transfer station. This sheet feeding mechanism, generally designated 32, includes a sheet source, such as a tray, for a plurality of sheets of a suitable transfer material, that is, typically, sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, suitable guides are positioned on opposite sides of the feed rollers.

The transfer of the xerographic powder image from the drum surface to the transfer material is effected by means of a corona transfer device 34 that is located at or immediately after the point of contact between the transfer material and the rotating drum. The corona transfer device 34 is substantially similar to the corona charging device that is employed at charging station A, in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station there is positioned a transfer material stripping apparatus or paper pickoff mechanism, generally designated 36, for removing the transfer material from the drum surface. This device includes a plurality of small diameter, multiple outlet conduits of a manifold that is supplied with pressurized aeriform fluid by a pulsator operated by a suitable power means. The pulsator is adapted to force jets of pressurized aeriform fluid through the outlet conduits into contact with the surface of the drum slightly in advance of the sheet material to strip the leading edge of the sheet material from the drum surface and to direct it onto an endless conveyor 38 whereby the sheet material is carried to a fixing device, such as, for example, heat fuser 42, whereby the developed and transferred xerographic powder image on the sheet material is permanently fixed thereto.

After fusing, the finished copy is preferably discharged from the apparatus at a suitable point for collection externally of the apparatus. To accomplish this, there is provided a vertical conveyor, generally designated 44, by means of which the copy is delivered to a copy holder or collecting tray positioned in a suitable super-structure overhanging the rear portion of the desk top.

The next and final station in the device is a drum cleaning station E, having positioned therein a drum cleaning device 46 adapted to remove any powder remaining on the xerographic drum after transfer by means of a rotating brush and whereby the xerographic drum is flooded with light to cause dissipation of any residual electrical charge remaining on the xerographic drum.

To remove residual powder from the xerographic drum, there is disposed a cylindrical brush rotatively mounted on an axle. For collecting powder particles removed from the xerographic drum by the brush there is provided a dust hood that is formed to encompass approximately two-thirds of the brush area. To insure thorough cleaning of the brush a flicking bar is preferably secured to the interior of the dust hood adjacent the edge of the exhaust duct and in interfering relation with the ends of the brush bristles whereby dust particles may be dislodged therefrom.

For removing dust particles from the brush and dust hood, an exhaust duct is arranged to cover a slot that extends transversely across the dust hood and in the filter box. A motor-fan unit, connected to the filter box, produces a flow of air through the filter box drawing air through the area surrounding the xerographic drum and the dust hood, the air entraining powder particles removed from the drum by the brush as the air flows through the dust hood. Powder particles are separated from the air as its flows through the filter bag so that only clean air reaches the motor-fan unit.

Any residual electrical charge remaining on the xerographic drum is dissipated by light from a fluorescent lamp mounted in a suitable lamp housing hinged to the dust hood, a starter being provided for energizing the fluorescent lamp.

Suitable drive means drive the drum, lens element, and slotted light reflector at predetermined speeds, relative to each other and included are means to return the lens element and the slotted light reflector to their respective traverse starting positions and means to effect operation of the bucket-type conveyor, toner dispenser, endless conveyor, vertical conveyor; the separating roller and feed rollers being controlled in a manner to permit the feed of a sheet of transfer material into registered contact with the developed image on the xerographic drum as it is rotated through the transfer station. Stated in a different manner, a sheet of transfer material is advanced in time relation to the start of scan of the leading edge of copy.

Referring now to FIGS. 2 and 3, there is shown the general arrangement of the xerographic apparatus within the desk. 1. As shown, there is provided a frame for supporting the components of the apparatus formed by a base plate 10 to which are mounted full front and rear plates 11 and 12, respectively, and partial plate 13. The plates are connected together and maintained rigidly in spaced relation to each other by suitable tie plate, not shown.

As shown in FIG. 2, the xerographic drum 20 is mounted on horizontal driven shaft SH6 and the drum is positioned on the exposed front face of front plate 11, with the major xerographic components of the machine mounted around the drum either on the exposed front face of plate 11 or between plate 11 and partial plate 13.

The main drive elements and controls for the xerographic components are mounted between front and rear plates 11 and 12, respectively, as shown in FIG. 3, and they include as major components thereof, a main drive motor MOT-1, a scan control mechanism 48 for operating the movable elements of the optical system 24, a programmer 50 for actuating the operation of the paper feed system 32 and paper pickoff mechanism 36, a clutch mechanism 52 for effecting alternate operation of the separator and feed rollers in the paper feed system, and a lever control system 54 for adjusting the length of scan, toner dispensing rate, and separator roller tension.

It is believed that the foregoing description is sufficient for the purpose of this application to show the general operation of the xerographic apparatus. For further details concerning the specific construction of the xerographic copier-duplicator shown, reference is made to copending Mayo et al. application, Serial No. 824,500, filed July 2, 1959.

*Paper Feed System*

Referring now to the paper feed system, the sheet feeding mechanism 32, positioned in the image transfer station D, for seriatim feeding of cut-sheet transfer material into contact with the xerographic drum so that the developed powder images on the surface of said drum may be transferred to the transfer material, consists of a tray for holding a supply of cut-sheet transfer material, separator rollers for separating a single sheet of transfer material from said supply, feed rollers for feeding a single sheet into contact with the drum and means for coordinating the operation of the separator rollers and feed rollers to thereby feed a single sheet of transfer material into contact with the drum for proper registration of the powder image on the drum onto the transfer material.

Referring now specifically to FIGS. 4 through 19, inclusive, the apparatus for feeding sheets of transfer material to the xerographic drum 20 in timed relation to the appearance of a developed image thereon includes a pair of forwarding or feed rollers 401 and 402, usually made of rubber or similar material, mounted in cooperative relation to each other in front of guides 403 and 404 which direct sheets of transfer material forwarded by said feed rollers into contact with the drum 20 at a point at or slightly in advance of the corona transfer device 34.

Figure 4:
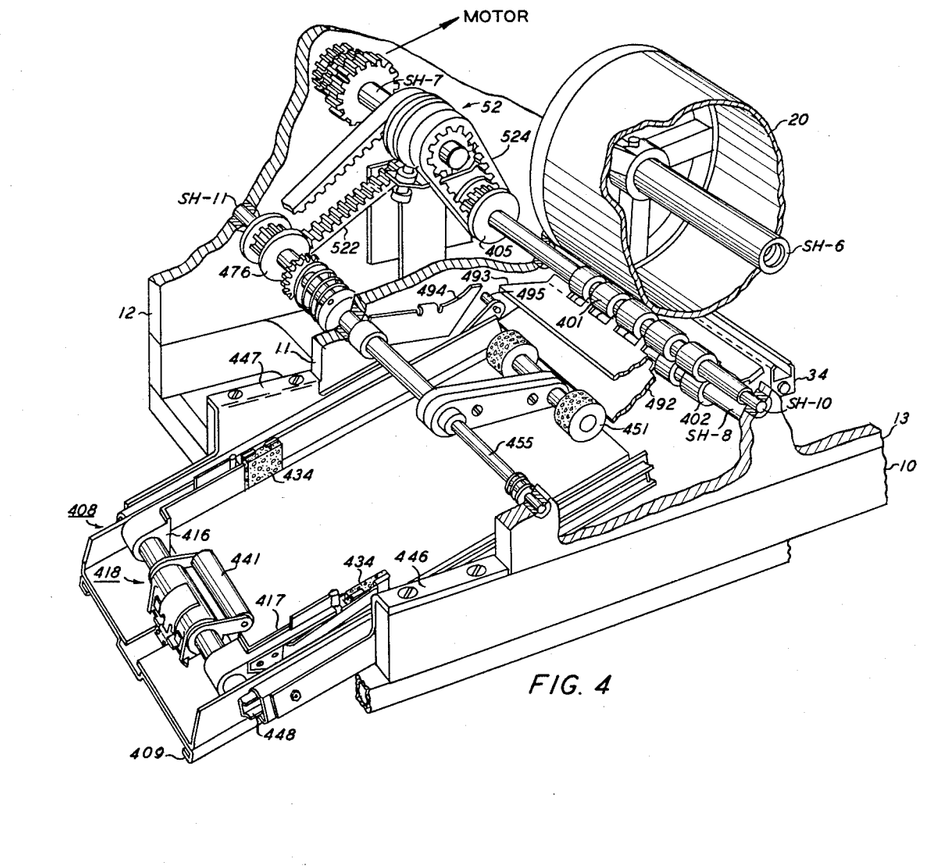
FIG. 4 is a right-hand perspective view, partly in section, of the paper feed mechanism of the apparatus.

Feed roller 401, which is a driven roller, is mounted in position by shaft SH–10 journaled in frame plates 11 and 13 and is driven by pulley 405 secured to the end of shaft SH–10. Feed roller 402, which is an idler roller, is mounted on shaft SH–8 journaled at its ends in arms 406 pivotally mounted on frame plates 11 and 13, the feed roller 402 being yieldingly biased against the feed roller 401 by means of springs 407 so that feed roller 402 is driven by frictional engagement with roller 401 or with a sheet of transfer material interposed between said rollers.

A supply of cut sheet material that is, typically, sheets of paper or the like, to be fed one at a time to the feed rollers 401 and 402 is held in a paper tray 408 slidably positioned at the front of the machine between frame plates 11 and 13.

Figure 6:
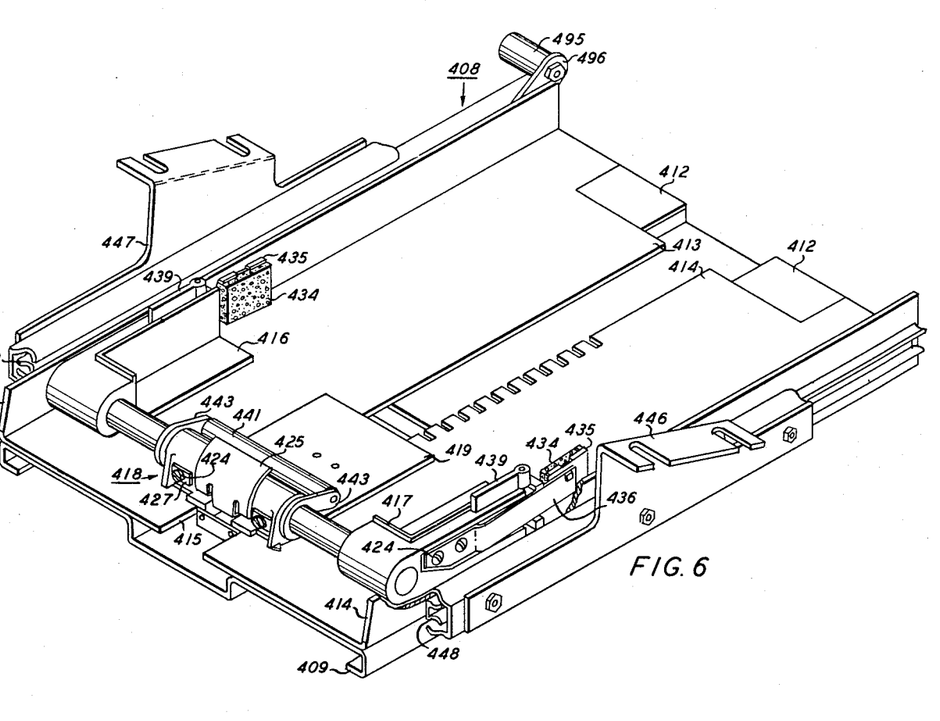
FIG. 6 is a right-hand perspective view of the paper feed tray removed from the xerographic apparatus.
Figures 7, 11:
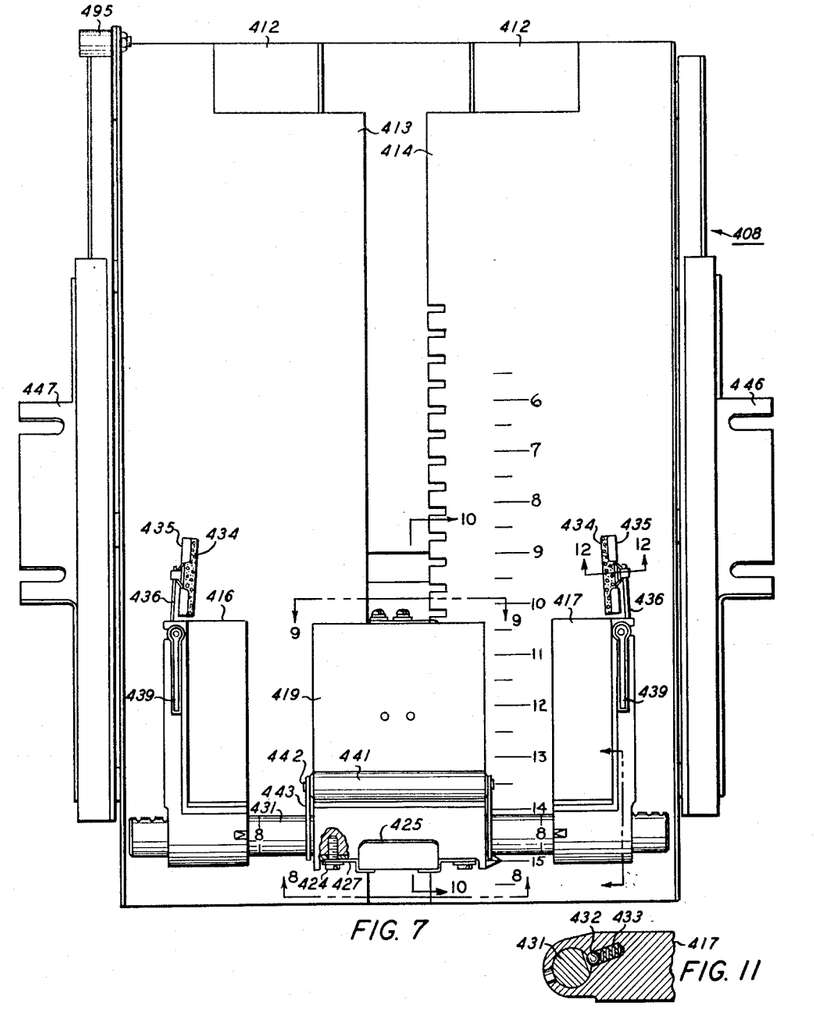
FIG. 7 is a top view of the paper feed tray.
FIG. 11 is a sectional view taken along line 11—11 of FIG. 7.
Figure 8:
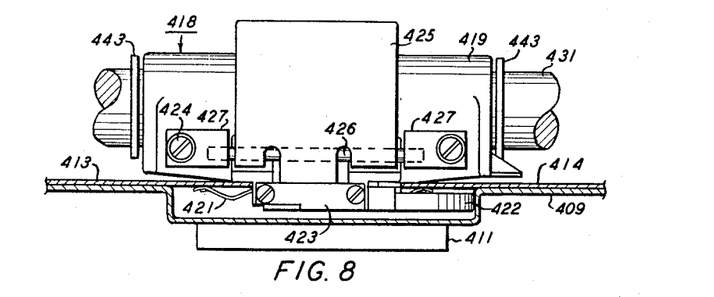
FIG. 8 is a sectional view taken along line 8—8 of FIG. 7.
Figure 9:
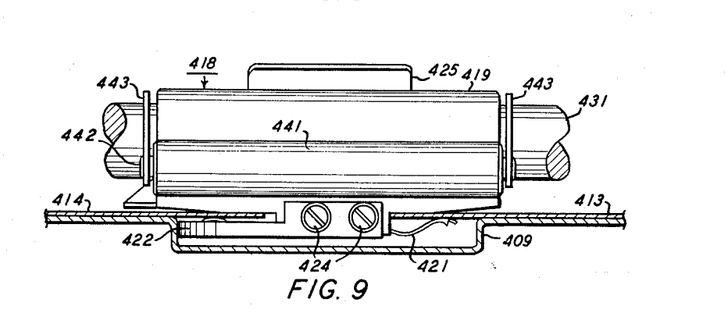
FIG. 9 is a sectional view taken along line 9—9 of FIG. 7.

The paper tray, includes a base member 409 having angle plates 413 and 414 secured thereon, as by welding, the angle plates being positioned with their upright legs parallel to and adjacent the sides of the base member and with their lateral legs partially extending over the center channel of the base member to form a slot 415.

Sheets of paper or other material are positioned both longitudinally and laterally on the tray by means of margin guides 416 and 417 adjustably mounted on the tray by means of shaft 431 in a manner to be described. Each of the margin guides 416 and 417, formed complementary to each other, is provided with an upright side leg, an upright back leg at right angles to the side leg to guide the side and back edge, respectively, of the paper, and a lateral extending leg adapted to rest on the top of the paper tray.

Figures 5, 12, 13:
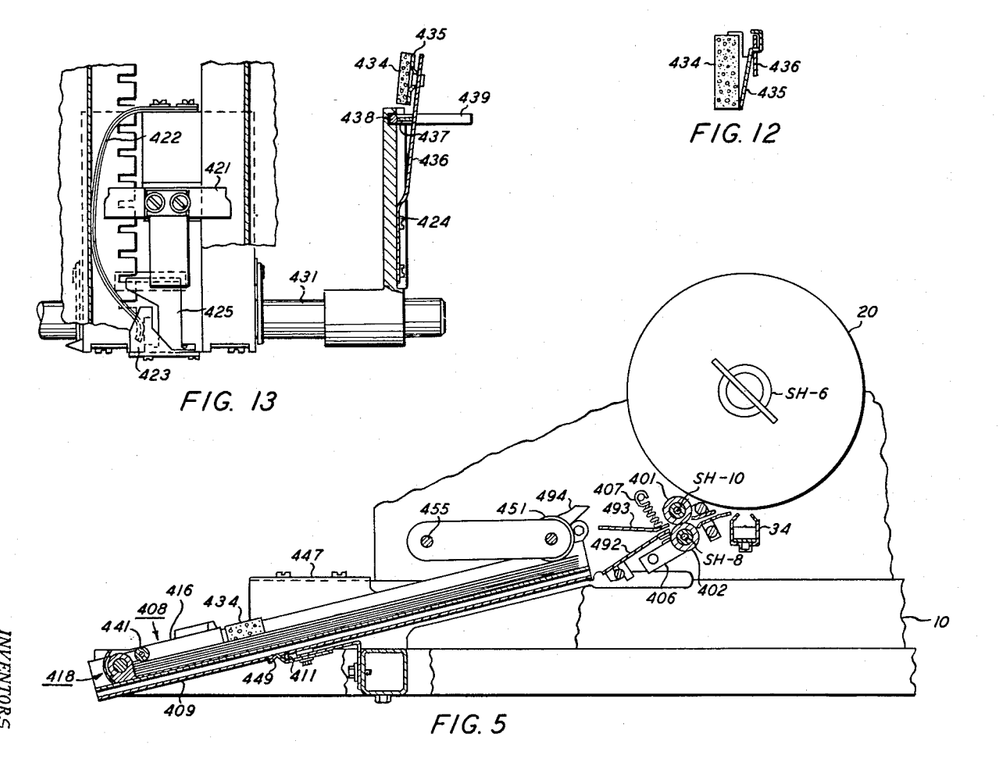
FIG. 5 is a side sectional view of the image transfer station of the xerographic appartus and associated elements.
FIG. 12 is a sectional view taken along line 12—12 of FIG. 7.
FIG. 13 is a bottom view of a portion of the paper tray with parts broken away to show the arrangement of the back guide assembly.

The margin guides are adjustably positioned on the tray by means of a back guide assembly 418 adapted to be selectively positioned along the length of the tray. Back guide assembly 418 includes a back guide plate 419 adapted to ride on the top surface of the tray and is centered on the tray by means of a depending narrow bar portion of the back guide plate which is adapted to ride in slot 415. Leaf spring 421, secured to the bar portion, retains the back guide plate 419 on the tray, while the lefthand edge of the bar portion is biased against the edge of left-hand angle plate 413 by means of leaf springs 422 secured at one end by screws 424 to the front of the back guide plate. The free ends of the leaf springs 422 are guided by means of a spring guide 423 secured to the rear of the back guide plate by screws 424.

Figure 10:
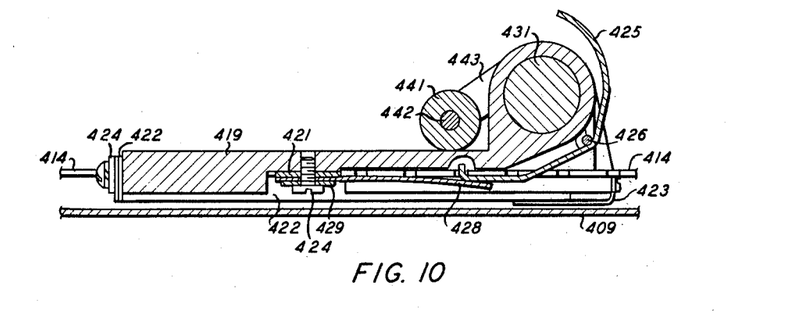
FIG. 10 is a sectional view taken along line 10—10 of FIG. 7.

To permit longitudinal positioning of the back guide plate on the tray, a latch 425 is pivotably mounted on a latch shaft 426 positioned in a suitable groove formed in the back of the back guide plate and secured thereto by shaft support blocks 427 secured by screws 424 extending through the shaft support blocks and threaded into the back guide plate. The latch 425 is provided with a leg portion, as seen in FIG. 10, adapted to slide into the notched or indented portions of the right hand angle plate 414, whereby the longitudinal position of the back guide plate can be maintained as desired. The leg portion of the latch 425 is normally biased upward into locking position in a notched or indented portion of the angle plate by means of a latch spring 428 positioned normal to leaf spring 421, both springs being held in position by cover plate 429 secured by screw 424 to the underside of the back guide plate. When it is desired to move the back guide assembly the operator depresses the upper curved portion of the latch toward shaft 431 thereby pivoting the latch about latch shaft 426 to disengage the leg portion from the notched or indented portions of the right hand angle plate 414.

Shaft 431 mounted in the bored portion of the back guide plate 419, and secured in alignment therein by suitable set screws, not shown, extends from opposite sides of the back guide plate to support the margin guides 416 and 417, which are suitably bored to slide on the shaft.

To permit lateral adjustment of the margin guides, each of the margin guides is bored, as shown in FIG. 11, to receive a detent 432, in the form of a ball, which is biased by spring 433 into one of the suitably positioned notches formed in the shaft, whereby the margin guides can be readily indexed by the operator into the desired position for paper of various widths.

To aid the operator to quickly and correctly position a stack of paper in the tray, the shaft 431 is provided at opposite ends with two duplicate scales for lateral positioning of the stack, and the angle plate 414 is provided with a scale for longitudinal positioning of the stack, suitable index markers being provided on the margin guides and on the back guide plate for the convenience of the operator in determining the proper location of these elements.

Side frictional retention of the stack, to permit single feeding of the sheets is obtained by means of pressure pads 434, usually made of rubber or other suitable material, carried by the margin guides 416 and 417. The pressure pads 434 are mounted in such fashion that they can be replaced wherever desired. Each pad is secured, as by cement, to a sheet metal carrier 435 having a bent upper hook portion adapted to be inserted through a suitable aperture in the bracket 436, whereby the carrier, with the pad thereon, is somewhat loosely secured to permit slight movement of the carrier to adjust the pad against the side margin of the stack. The bracket, formed as a bent leaf spring, is secured at one end by screws 424 to the side of a margin guide with the free end of the spring extending beyond the front of the margin guide in position to normally bias the pressure pad against the side margin of a stack. To facilitate the placing or removal of a stack of paper on the tray there is provided a cam 437 on lever arm 438 loosely journaled in suitable slots formed in the side of the margin guide whereby the free end of a bracket 436 can be cammed away from the side of a stack of paper by rotation of the lever arm by means of lever 439 secured at one end thereof.

To further assure the feeding of sheets singly from the stack of paper, there is provided a drag roller 441, that is adjustably positioned, when in its operative position to rest on the top most sheet of the stack. To obtain this result the drag roller 441 is rotatably journaled on axle 442 secured at opposite ends in the ends of a pair of arm 443 rotatably mounted on shaft 431 on opposite sides of the back guide plate. The drag roller, preferably made as a solid piece, because increased weight of this member is desired, is arranged in its operative position adjacent the rear end of the stack so that, as the trailing edge of the top most sheet of the stack is advanced only a short distance from under the drag rollers, the drag roller will be immediately effective to place a drag resistance on the next sheet to prevent its advance to any undesirable degree, by friction from the top most advancing sheet. When a stack of paper is to be inserted into the paper tray, the drag roller is moved out of the way to an inoperative position by merely rotating the arms around the shaft 431.

To prevent the bottom sheet of the stack of paper from being inadvertently drawn forward by the feeding and separating rollers 451, pads 412, usually made of rubber or other suitable material, are provided at the front of the paper tray.

Right-hand bracket 446 and left-hand bracket 447 connected to base plate 10 are adapted to support the paper tray assembly by means of a pair of commercial type drawer slides 448. As shown in FIGS. 4 and 6, the male portions of the slides are secured to the angle plates 413 and 414, and the complementary portions of the slides are secured to the brackets 446 and 447.

As shown, in FIG. 5, the paper tray is maintained in operative relation to the feeding and separating roller for seriatim feeding of sheets therefrom by means of a spring detent assembly 449 fastened to channel 14, forming part of the desk frame, positioned on the underside of base plate 10. The spring detent engages a depending leg 411 of the base member 409 of the paper tray.

Figure 14:
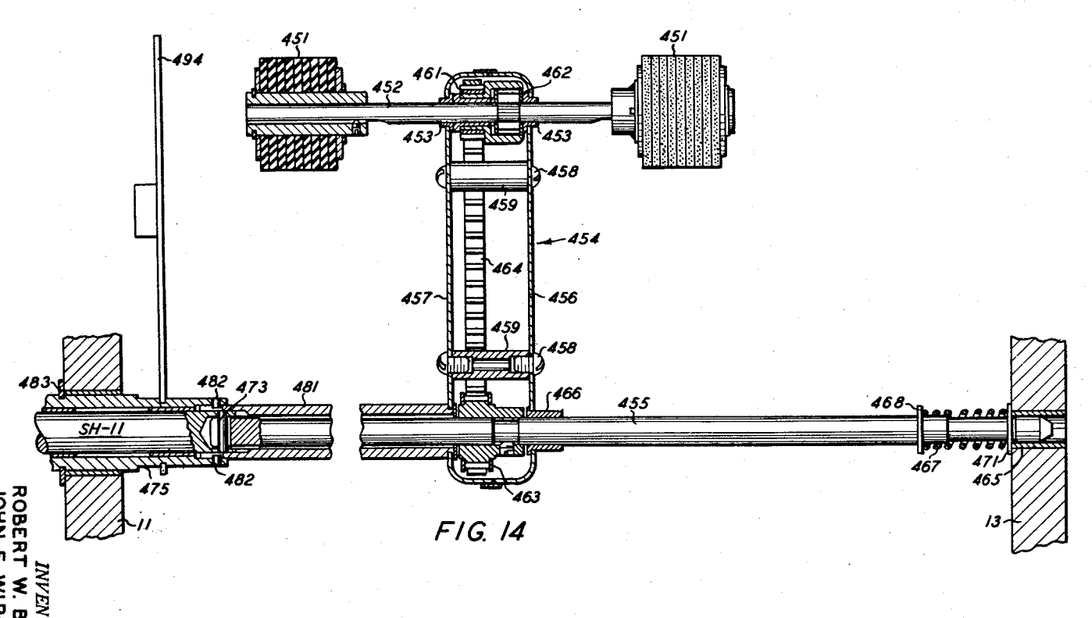
FIG. 14 is a sectional view of the paper separator roller and associated elements.

To feed sheets of transfer material one at a time from the paper tray 408 into the bite of the feed rollers, there is provided a paper feeding and separating means comprising intermittently driven rollers 451 fixedly mounted upon shaft 452 journaled in bearings 453 mounted in arm 454 adapted to swing about the axis of driven shaft 455. As shown in FIG. 14, the arm 454 consists of arm shells 456 and 457 butted together and held in place by screws 458 extending through the arm shells to be threaded into spacers 459.

The means for driving the rollers 451 comprises pulley 461 secured to a conventional slip clutch 462, and pulley 463 mounted on shafts 452 and 455, respectively, and operatively connected together by means of timing belt 464.

The slip clutch 462 permits the rollers 451 to be rotated either by timing belt 464 or by frictional contact with a sheet of transfer material as it is pulled forward by feed rollers 401 and 402.

Shaft 455 which is journaled by bearing 465 in frame 13 and by bearing 466 in arm shell 456 is normally biased to the left as seen in FIG. 14, by means of spring 467 interposed between snap ring 468 on shaft 455 and shaft encircling washer 471 butted against frame 13. As shaft 455 is forced to the left, the opposite or notched end of the shaft is forced into the aperture in the end of shaft SH-11 to engage drive pin 473 secured therein. As shown, in FIG. 15, shaft SH-11 which is journaled in bearings 464 positioned in frame 12 and in sleeve 475, has an intermittently driven pulley 476 secured thereon. Washers 477 and 478 ride against a shoulder on shaft SH-11 to prevent axial movement of said shaft to the left as seen in FIG. 15.

Figure 15:
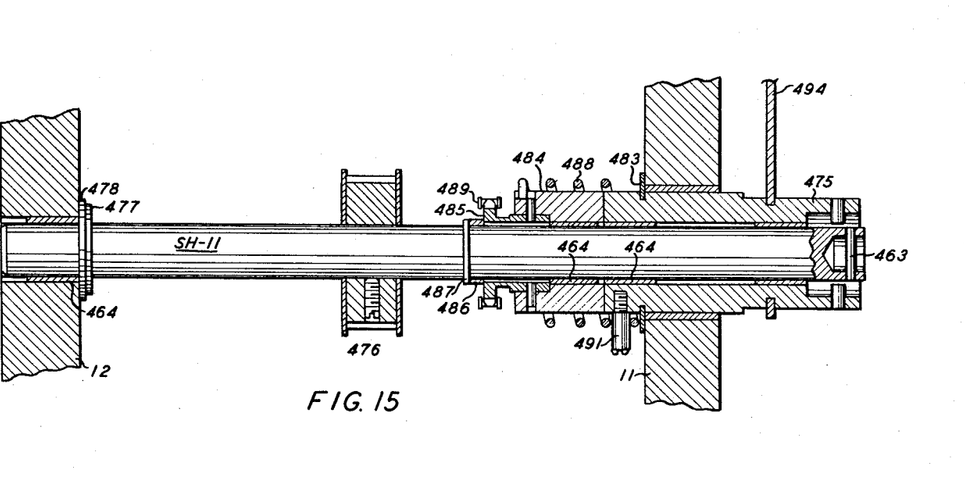
FIG. 15 is a sectional view of the paper separator roller drive and tensioning elements.

To adjust the pressure of rollers 451 on the stack of transfer material in paper tray 408, the arm 454 is fixed to one end of arm shaft 481, the opposite end of the arm shaft being notched to engage drive pins 482 secured to the counter-bored end of sleeve 475 journaled in frame 11, the sleeve being retained against axial movement to the right as seen in FIGS. 14 and 15 by snap ring 483 secured in a suitable groove formed in the sleeve.

A spring tension sleeve 484, having gear 485 secured thereon by (pins) 479, is loosely mounted by a bearing 464 adjacent sleeve 475 on shaft SH-11, and is axially aligned on the shaft by thrust bearing 486 abutting snap ring 487 positioned in a suitable groove on the shaft. Torque is applied by means of coil spring 488 secured at one end by spring pin 491 to sleeve 475 and at its opposite end to spring tension sleeve 484 by having the end of the spring forced into a suitable aperture in said spring tension sleeve. By rotating gear 485 by means of chain 489 operated in a suitable manner (not shown) by a control lever of lever control system 54 in lower control panel 7, roller pressure on the stack of paper in paper tray 408 can be adjusted by an operator to accommodate any weight paper used as a transfer material.

Interposed between rollers 451 and feed rollers 401 and 402 there is provided, as shown in FIGS. 4 and 5, a pair of paper guides 492 and 493 supported at opposite ends by frames 11 and 13 to guide each sheet of transfer material forwarded by rollers 451 into the bite of rollers 401 and 402.

To permit the rollers 451 to clear a stack of transfer material in paper tray 408, as the tray is moved to its normal operating position as shown in FIG. 4, or when the tray is removed from its normal operating position, there is provided a cam arm 494 and cam follower 495 to pivot arm 454 to elevate the rollers 451.

As shown, cam arm 494, having a cam riser at one end thereof is secured at its opposite end, as by welding, to sleeve 475 connected as described by means of arm shaft 481 and arm pins 482 to the arm 454, whereby movement of the cam arm 494 effects an equal movement of arm 454. To effect movement of cam arm 494, as the paper tray 408 is moved into or out of its normal operating position, the cam follower 495 is secured to a cam follower support 496 fixed to the vertical leg of angle plate 413 of paper tray 408.

Both the operation of the paper separator rolls 451 and the paper feed roll 401 is effected by the clutch mechanism 52 of the invention actuated by a programmer 50 of the type disclosed in the referenced Mayo et al. application.

As illustrated in FIGS. 3, 4, 16, 17 and 18, clutch mechanism 52 which is mounted between frame plates 11 and 12, include a shaft SH-7 bored at opposite ends to receive bearings 501 whereby the shaft is journaled for rotation on the reduced end portions of spindles 502 extending through suitable apertures in the frame plates 11 and 12 and retained in place by screws 503.

Figure 17:
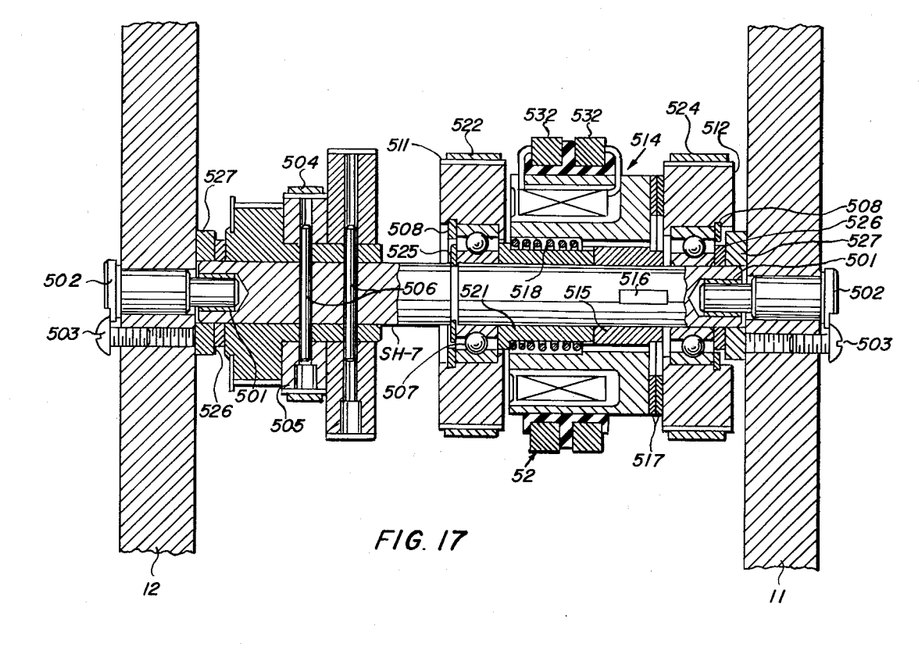
FIG. 17 is a sectional view of the clutch mechanism of the paper feed system.

Shaft SH-7 is connected operatively to the main drive motor MOT-1 of the machine by belt 504, which runs on compound pulley 505 fixed to shaft SH-7 by pins 506 and on a pulley, not shown, connected to the motor.

Mounted on the shaft for rotation relative to the shaft are a pair of clutch elements 511 and 512 forming a first clutch element and a second clutch element, respectively, of the clutch mechanism. The clutch elements are rotatably supported on the outer races of bearings 507 mounted in spaced relation on the shaft. The outer races of the bearings are held against the bored shoulder portions of the clutch elements by retaining rings 508 positioned in suitable annular grooves formed in the clutch elements.

Clutch element 511 is provided with peripheral teeth and is in effect a drive pulley connected, as shown in FIG. 4, by timing belt 522 to driven pulley 476 to operate the paper separator rollers 451. In a similar manner, clutch element 512 is also provided with peripheral teeth and is a drive pulley connected by timing belt 524 to driven pulley 405 to operate the paper feed roll 401.

Mounted between the clutch elements, and adapted to coact therewith is a third clutch element or armature 514 forming with clutch elements 511 and 512 an electromagnetic clutch assembly.

To permit the armature to rotate with the shaft while being free for relative movement with respect to the axis of the shaft, the armature is mounted on splined hub 515 secured as by key 516 to rotate with the shaft.

The second clutch element 512 and the adjacent face, right-hand face as seen in FIG. 17, of armature 514 are provided with annular friction pads 517 suitably secured thereon whereby the clutch element 512 is driven by the armature through contact of the annular friction pads. The armature, which is normally de-energized, is biased into driving engagement with clutch element 512 by means of spring 518 encircling bushing 521 loosely mounted on shaft SH-7. One end portion of the spring engages the shoulder of bushing 521 and the opposite end portion of the spring engages the bored shoulder portion of armature 514.

The force of spring 518 should be sufficient to force the armature into frictional driving contact with clutch element 512 while still permitting the armature when energized to overcome the force of the spring to operatively engage the clutch element 511.

To limit axial movement of the clutch assembly on the shaft SH-7, the inner race of the left-hand bearing 507 is positioned by retaining ring 525 mounted in a suitable groove provided in the shaft. The inner race of the right-hand bearing abuts bearing 526 riding against thrust washer 527 positioned against the inner face of frame plate 11. This structure also limits axial movement of the shaft in one direction, while axial movement of the shaft in the opposite direction is limited by bearing 526 mounted between the compound pulley 505 fixed to the shaft and thrust washer 527 positioned against the inner face of frame plate 12.

The armature 514, of conventional construction, is connected to a suitable source of power, as described hereinafter, through brushes 31 bearing on suitable collector rings 532 on the armature.

Figures 16, 18, 19:
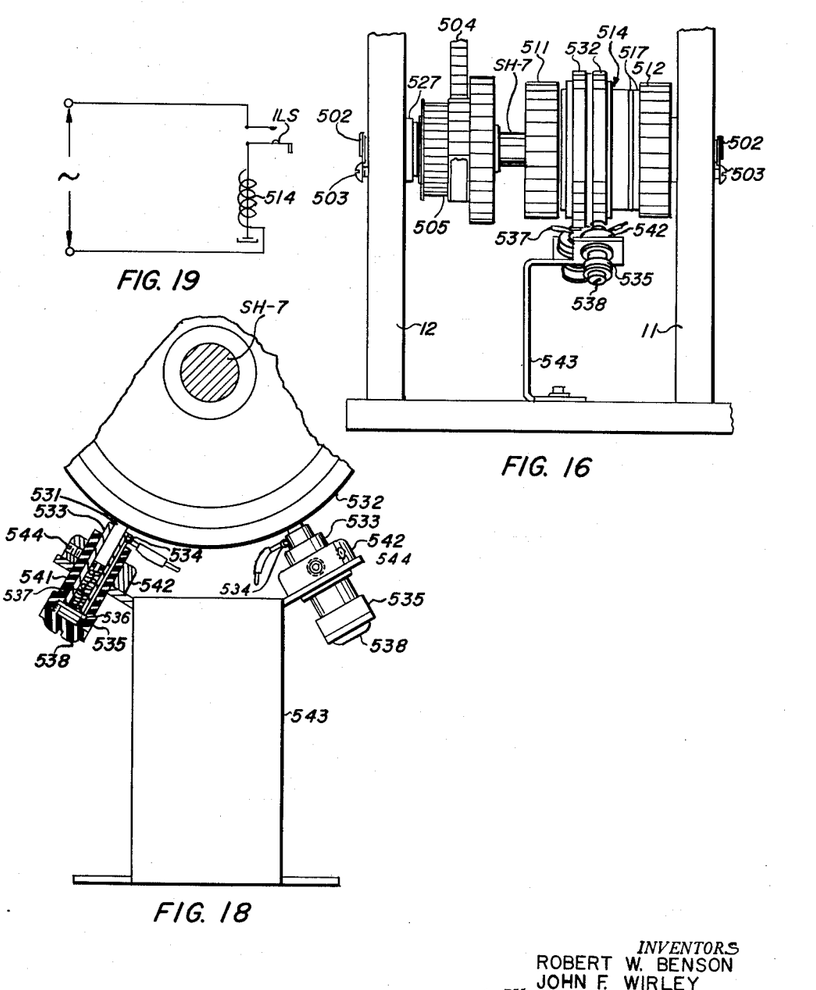

Each brush, as shown in detail in FIG. 18, is slidably mounted in a brush guide 533 and connected to a conductive line of the electrical circuit by means of a terminal strip 534. The brush guide is mounted in a holder 535 and the terminal strip is inserted between a flat on the brush guide and the holder 535 in electrical contact with terminal 536 connected by wire 537 to the brush. The terminal 536 is positioned in counterbored threaded portion of the holder and held therein by a screw cap 538 so that the spring 541 encircling the wire will bias the brush into electrical contact with a collector ring. Both the holder 535 and screw cap 538 are made of a suitable dielectric material.

The holders 535 for the brushes are adjustably mounted in collars 542 secured to the turned up legs of component bracket 543 mounted on the base plate 10 of the machine. Set screws 544 threaded in the collars are used to secure the holders adjacent to the collector rings in position for the brushes to contact the collector rings.

In FIG. 19, there is shown a simplified wiring circuit to effect operation of the clutch mechanism. As shown, the armature of the magnetic clutch is connected in series with a normally open limit switch 1LS to a suitable source of electric power.

The limit switch 1LS is closed, in timed relation to the formation of an image on the xerographic drum, to effect operation of the paper separating rollers and the feed rolls for feeding a sheet of transfer material into contact with the xerographic drum in registration with the developed image on the drum as it is rotated through the transfer station. Any suitable mechanism may be used to actuate the limit switch, such as a programmer mechanism 59 of the type disclosed in the referenced co-pending Mayo et al. application.

Referring now to the operation of the clutch mechanism 52, the armature 514 of the clutch mechanism is normally de-energized to enable the spring 518 to force the armature into frictional driving engagement with the clutch element 512 to drive the paper feed roll 401. When the limit switch 1LS is actuated to energize the armature, the armature will move to the left, as seen in FIG. 17, against the force of spring 518, out of engagement with clutch element 512 and into driving engagement with clutch element 511 to effect operation of the paper separator rollers 451. As the separator rollers 451 are driven, they forward a sheet of transfer material into the V formed by rollers 401 and 402, where its forward motion is momentarily stopped. As the movement of a sheet of transfer material under separator rollers 451 continues after the leading edge of the sheet has been stopped by rollers 401 and 402, the sheet is buckled as the separator rollers continue to rotate. The rotation of the separator rollers is continued just sufficiently to buckle the paper whereby the resiliency of the paper forces the leading edge of the sheet into transverse alignment with the rollers 401 and 402, irrespective of its original alignment thereto, so that the sheet is forwarded by the feed rollers in correct alignment onto the drum. As the actuating force on limit switch 1LS is removed to open the circuit, the armature is de-energized, permitting it again to engage clutch element 512 through the biasing action of spring 518 to operate feed roll 401 which in cooperation with feed roll 402 advances the sheet into contact with the xerographic drum.

While the invention has been described with reference to a preferred embodiment of the paper feed mechanism disclosed herein, it is not confined to the details set forth since many modifications and changes will become apparent to those skilled in the paper feeding art. This application is intended to cover such modifications or changes as may come within the purposes of the improvements or the scope of the following claims.

What is claimed is:

1. In a sheet feeding apparatus,
the combination of a frame,
a feed tray mounted on said frame to support a stack of sheets,
feed rollers journaled in said frame in position to receive a sheet from said feed tray,
a separator means operatively connected to said frame in position to feed sheets seriatim from said feed tray to said feed rollers,
a driven shaft journaled in said frame,
a first clutch element and a second clutch element mounted in spaced relation on said driven shaft for rotation relative to said driven shaft,
said first clutch element being operatively connected to said separator means,
said second clutch element being operatively connected to said feed rollers,
an armature connected to said driven shaft for rotation therewith and positioned between said first clutch element and said second clutch element for axial movement therebetween,
spring means positioned to normally bias said armature into driving engagement with said second clutch element,
and energizing means positioned in electrical contact with said armature to sequentially energize said armature whereby said armature will move out of engagement with said second clutch element and into driving engagement with said first clutch element.

2. In a sheet feeding apparatus, the combination of a frame,
a feed tray mounted on said frame to support a stack of sheets,
feed rolls journaled in said frame in position to receive a sheet from said feed tray,
a separator means operatively connected to said frame in position to feed sheets seriatim from said feed tray to said feed rollers,
a driven shaft journaled in said frame,
a first clutch element operatively connected to said separator means,
and a second clutch element operatively connected to said feed rollers,
said first clutch element and said second clutch element being mounted in spaced relation on said driven shaft for rotation relative to said driven shaft,
an armature connected to said driven shaft for rotation therewith and positioned between said first clutch element and said second clutch element for axial movement therebetween,
spring means positioned to normally bias said armature into driving engagement with said second clutch element to drive said feed rollers,
and energizing means positioned in electrical contact with said armature to sequentially energize said armature whereby said armature will move out of engagement with said second clutch element and into driving engagement with said first clutch element to actuate said separator means.

3. In a sheet feeding apparatus, the combination of a frame,
a feed tray mounted on said frame to support a stack of sheets,
feed rollers journaled in said frame in position to receive a sheet from said feed tray, a separator means operatively mounted on said frame in position to feed sheets seriatim from said feed tray to said feed rollers,
a driven shaft journaled in said frame,
a first clutch element and a second clutch element mounted in spaced relation on said driven shaft for rotation relative to said driven shaft,
said first clutch element being operatively connected to said separator means,
said second clutch element being operatively connected to said feed rollers,
a splined hub fixed to said driven shaft between said first clutch element and said second clutch element,
an armature movably connected to said splined hub for axial movement between said first clutch element and said second clutch element,
spring means positioned to normally bias said armature into driving engagement with said second clutch element,
and electrical circuit means positioned in electrical contact with said armature to sequentially energize said armature whereby said armature will move out of engagement with said second clutch element and into driving engagement with said first clutch element.

No references cited.